UNITED STATES PATENT OFFICE.

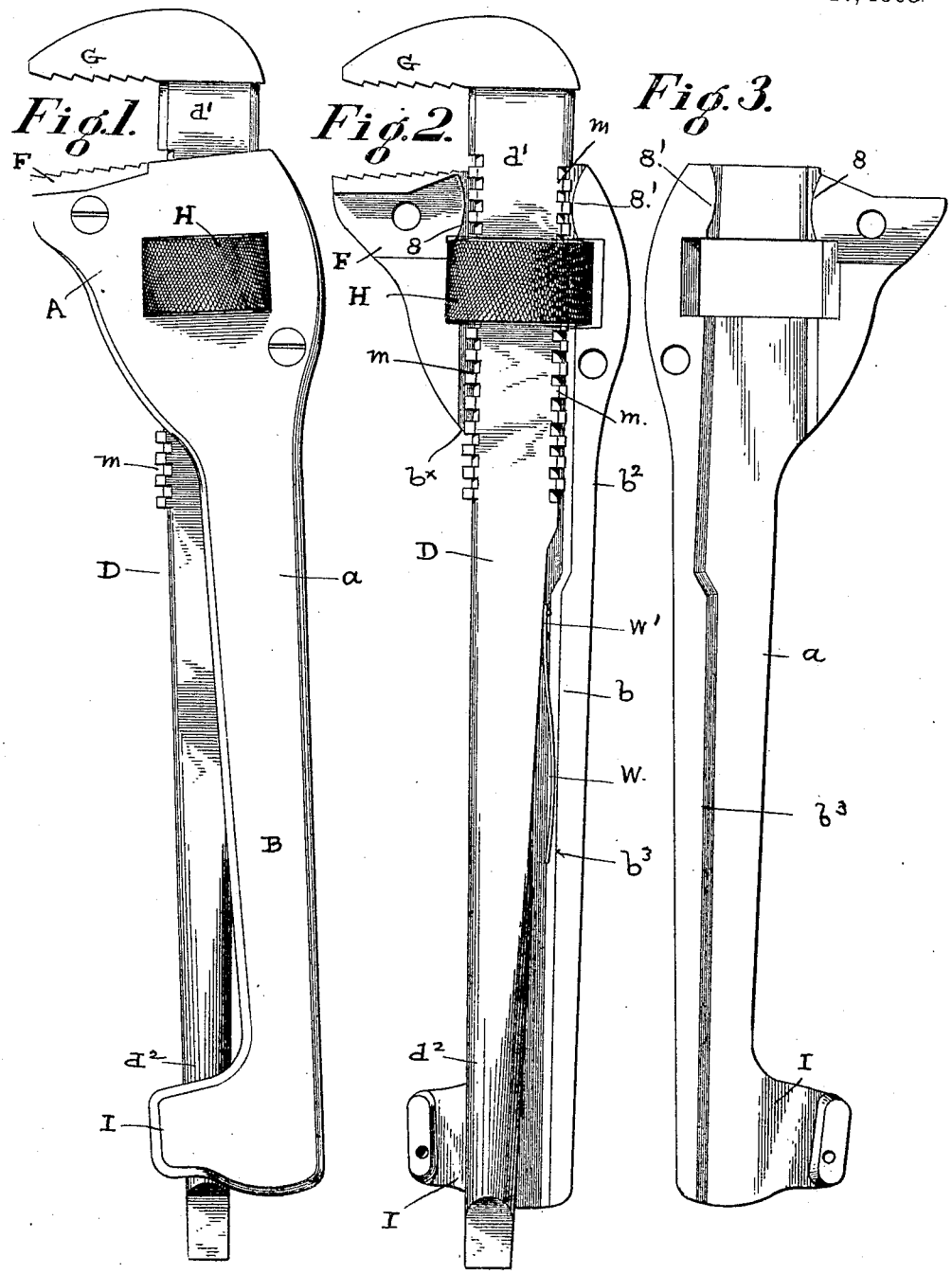

GEORGE E. WOODBURY, OF SAN FRANCISCO, CALIFORNIA.

PIPE-WRENCH.

No. 904,108.　　　　Specification of Letters Patent.　　　Patented Nov. 17, 1908.

Application filed April 18, 1908. Serial No. 427,877.

*To all whom it may concern:*

Be it known that I, GEORGE E. WOODBURY, a citizen of the United States, and a resident of the city and county of San Francisco and State of California, have invented new and useful Improvements in Pipe-Wrenches, of which the following is a specification.

This invention relates to improvements made in wrenches for turning pipes, pipe-couplings and other articles or pieces of circular or cylindrical shape, as distinguished from nuts and other objects of polygonal shape.

The object of the invention is to provide a convenient and handy tool that will have the quality of taking a firm grip on the part to be turned as soon as it is placed thereon and force is applied to operate the tool, and the like quality of letting go as soon as the force is removed.

Further objects sought in this invention are to secure the necessary strength and stiffness with a minimum weight of material; to reduce the number of separate pieces of which the tool is composed, and to dispense with all joints and joinings of parts on lines transversely to the force or power that is applied to the tool to turn the piece in its grasp.

These and other ends and objects I secure and attain in and by the construction and combination of parts as hereinafter described and illustrated in the accompanying drawing.

Figure 1 of the said drawing represents in general elevation an adjustable wrench embodying my invention; showing the jaws open and set ready to be placed on the piece to be grasped and turned. Fig. 2 is an elevation of the wrench, with one side of the stationary shank removed to show the internal form and the construction of the movable shank that is inclosed thereby. Fig. 3 is a view of the side of the stationary shank which is removed from Fig. 2.

The part termed the stationary member of the shank is composed of the two recessed plates $a$—$b$, which when placed together and united by screws $g$ at several points form a recessed head A, and a handle B integral with the head.

The parts are so shaped or formed, also, as to provide a longitudinal recess open on the front for the entire length of the handle B, as seen at $b^x$, Fig. 3, and closed on the back $b^2$, for the purpose of admitting and inclosing the shank of the movable jaw. On one side of this central recess the head is extended for a jaw, and is cut down to furnish a seat for a serrated plate F.

The shank D that carries the movable jaw G is fitted to slide longitudinally in the recess within the stationary shank and is also movable laterally in and out through the open front side of the recess. As seen in Fig. 2 the part D is composed of a straight bar with flat sides, of uniform thickness at the upper portion $d^1$ at and near the jaw G, but of reduced thickness and of a tapered form for the remaining portion, being also approximately round in cross-section on the lower portion $d^2$. This portion $d^2$ is finished round and smooth for the reason that when the handle is grasped by the workman this part and also the recessed portion of the stationary shank in which the part $d^2$ lies, are gripped in the hand and necessarily receive the pressure which must be thrown on them and thereby lock the jaws in order to properly retain hold on the piece to be turned.

The front and back walls of the socket or passage in the head are curved, as seen at $8$ and $8'$, Figs. 2 and 3, to furnish a rounded fulcrum or bearing point on which the shank D will rock when moving laterally in the head—this curved bearing being situated near the top of the socket so as to permit the required extent of angular movement in the shank D without binding in the socket.

The adjustment of the movable jaw to take in the piece to be turned is effected by moving the shank D longitudinally in the socket in the head; for which purpose the upper portion of the shank D is provided with teeth $m$ formed on the opposite edges, that are elements of a screw-thread and are fitted to an internally threaded nut or ring H in the head. The head is slotted transversely to admit the nut, and the last-named part is fitted to turn loosely in it, so as to intersect the longitudinal recess containing the threaded shank, and to turn loosely therein when it is rotated. The nut, is thus held in place, and serves to confine the shank as well as to move it in or out of the stationary jaw. It is fitted also somewhat loosely in the slot in order that the movable shank may have sufficient play laterally in the recessed handle to spread the jaws or cause them to assume an angular divergent position to each other, by virtue of which the jaws are set more widely apart at the first or outer ends than they are at the back nearer the shanks, under all variations in the size of the opening between the jaws, and the tool is more readily placed on the piece to be turned, and is likewise more easily removed; all liability of jamming or sticking on the piece within their grip being thereby removed and the tool quickly detached without first turning the nut to increase the opening between the jaws. This lateral movement of the shank D is produced by placing a flat spring between the shank D and the back of the recess in the stationary shank, as shown in Fig. 2 where the spring W attached to the shank D at $W^1$ is arranged to bear against the back $b^3$ of the recess in the handle.

On taking the pressure of the hand off the handle of the tool, the spring will tilt the movable shank D, and thus loosen the grip of the jaws upon the piece. Such lateral play of the movable shank D is limited, however, by a loop I formed on the lower end of the stationary shank through which the shank D is also fitted to slide. This loop is formed by an extension on each half of the stationary shank fitted to meet at the end, the proper width of opening between the sides of the loop being secured by ribs or thick ends on the inner faces, which are fitted to meet in a butt joint. A pin on one face and a hole in the opposite face form a ready means of setting and forming together the two parts at the lower end of the handle when the two halves are drawn together by the screws.

The two parts composing the shank and head of the stationary jaw are united on a longitudinal central joint and are readily forged with the head and shank in one piece; the two parts being united by the screws.

The movable shank and its jaw on the other hand are formed in one piece requiring little fitting of the shank to the socket in the head and the recess in the shank of the stationary jaw.

I claim:—

1. A wrench comprising a pair of jaws each provided with a shank adapted to be grasped by the hand, the shanks lying along side of each other and one being recessed to receive the other, means for moving one jaw and its shank longitudinally relative to the other, and means for causing one of the jaws to rock to a limited extent away from the other one, the jaws being forced toward each other when the two shanks are grasped by the hand.

2. A wrench comprising a recessed shank having a head portion carrying a jaw and which is slotted transversely to form an elongated opening, a screw-threaded movable shank fitted to slide longitudinally in the recessed shank and also adapted to move laterally therein, a nut carried by the movable shank arranged in the said opening and adapted, by engagement with the upper and lower sides of the opening, to operate the movable shank longitudinally, the said nut being movable laterally with the movable shank in the said opening.

3. The combination of a longitudinally movable, screw-threaded shank carrying a jaw at one end, a recessed shank carrying a fixed jaw and formed of a pair of members adapted to be placed together to form the shank, each of said members being slotted transversely to form, when the members are placed together, an elongated opening for a nut, and the said members being provided with curved shoulders, 8, 8', to form fulcrum points for the movable shank to permit it to move laterally, and a nut carried by the screw threaded portion of the movable shank and arranged in the openings in the said two members and adapted, by engagement with their top and bottom edges, to operate the movable shank.

4. A wrench comprising a pair of jaws each provided with a shank adapted to be grasped by the hand, the shanks lying along side of each other and one being recessed to receive the other, means for moving one jaw and its shank longitudinally relative to the other, means for causing one of the jaws to rock away from the other one, the jaws being forced toward each other when the two shanks are grasped by the hand, and means at the free end of one of the said shanks for limiting the lateral movement of the movable shank.

GEORGE E. WOODBURY.

Witnesses:
EDWARD E. OSBORN,
P. S. PIDWELL.